(12) United States Patent
Kim et al.

(10) Patent No.: US 8,665,975 B2
(45) Date of Patent: Mar. 4, 2014

(54) METHOD FOR RECEIVING DATA IN MULTI INPUT MULTI OUTPUT

(75) Inventors: Jaewon Kim, Seoul (KR); Jaewon Chang, Seoul (KR); Dong-Uk Lee, Seoul (KR); Wonjin Sung, Seoul (KR); Byoung-Hoon Kim, Gyeonggi-Do (KR); Jun-Ho Jo, Gyeonggi-Do (KR)

(73) Assignees: LG Electronics Inc., Seoul (KR); Industry University Cooperation Foundation, Sogang University, Seoul (KR)

( * ) Notice: Subject to any disclaimer, the term of this patent is extended or adjusted under 35 U.S.C. 154(b) by 103 days.

(21) Appl. No.: 13/376,831

(22) PCT Filed: Nov. 6, 2009

(86) PCT No.: PCT/KR2009/006515
§ 371 (c)(1), (2), (4) Date: Dec. 7, 2011

(87) PCT Pub. No.: WO2011/002132
PCT Pub. Date: Jan. 6, 2011

(65) Prior Publication Data
US 2012/0087400 A1    Apr. 12, 2012

Related U.S. Application Data

(60) Provisional application No. 61/221,546, filed on Jun. 29, 2009.

(51) Int. Cl.
*H04L 27/28* (2006.01)
(52) U.S. Cl.
USPC ........... 375/260; 375/141; 370/203; 370/437; 370/465

(58) Field of Classification Search
USPC ......... 375/141, 147, 260, 267, 264, 316, 340; 370/203, 208, 252, 278, 282, 319, 321, 370/344, 437, 464, 465, 480
See application file for complete search history.

(56) References Cited

U.S. PATENT DOCUMENTS

| | | |
|---|---|---|
| 2008/0299917 A1 | 12/2008 | Alexiou et al. |
| 2009/0141824 A1 | 6/2009 | Xia et al. |
| 2009/0161646 A1 | 6/2009 | Li et al. |
| 2011/0044400 A1* | 2/2011 | Collings et al. ............... 375/295 |
| 2011/0211647 A1* | 9/2011 | Alexiou et al. ............... 375/267 |
| 2013/0028340 A1* | 1/2013 | Yang et al. .................... 375/260 |
| 2013/0058205 A1* | 3/2013 | Tang ............................. 370/203 |
| 2013/0107920 A1* | 5/2013 | Kim et al. ..................... 375/219 |
| 2013/0107977 A1* | 5/2013 | Lakkis .......................... 375/267 |

* cited by examiner

*Primary Examiner* — Dac Ha
(74) *Attorney, Agent, or Firm* — Lee, Hong, Degerman, Kang & Waimey (57) ABSTRACT

Disclosed is a method for receiving data in a Multi Input Multi Output (MIMO) system, the method comprising: decoding data transmitted from a transmitter by using one beam-forming vector included in a codebook that beam-forming vectors are formed in a hierarchical structure according to at least one of change directions of radio channels, the number of channel change directions, and a change rate; determining whether to update the beam-forming vector based on the radio channel changes; selecting other beam-forming vector included in the codebook having a hierarchical structure when it is determined that update for the beam-forming vector is required; feed-backing information about an index indicating where the selected beam-forming vector is located in the hierarchical structure of the codebook to the transmitter; and decoding data received from the transmitter by using the selected beam-forming vector.

9 Claims, 5 Drawing Sheets

| Layer # | Codebook |
|---|---|
| 1 | $W_{\Delta_1}^{D_1}$ |
| 2 | $W_{\Delta_2}^{D_2}$ |
| ... | ... |
| M | $W_{\Delta_2}^{D_2}$ |

Fig. 5

| Layer # | Codebook |
|---|---|
| 1 | $W_\Delta^2 = \left\{ \begin{bmatrix} 1 \\ e^{-j\frac{\theta}{M}} \\ e^{-j2\frac{\theta}{M}} \\ e^{-j3\frac{\theta}{M}} \end{bmatrix}, \begin{bmatrix} 1 \\ e^{j\frac{\theta}{M}} \\ e^{j2\frac{\theta}{M}} \\ e^{j3\frac{\theta}{M}} \end{bmatrix} \right\}$ |
| 2 | $W_{2\Delta}^2 = \left\{ \begin{bmatrix} 1 \\ e^{-j\frac{2\theta}{M}} \\ e^{-j2\frac{2\theta}{M}} \\ e^{-j3\frac{2\theta}{M}} \end{bmatrix}, \begin{bmatrix} 1 \\ e^{j\frac{2\theta}{M}} \\ e^{j2\frac{2\theta}{M}} \\ e^{j3\frac{2\theta}{M}} \end{bmatrix} \right\}$ |
| ... | ... |
| M | $W_{M\Delta}^2 = \left\{ \begin{bmatrix} 1 \\ e^{-j\theta} \\ e^{-j2\theta} \\ e^{-j3\theta} \end{bmatrix}, \begin{bmatrix} 1 \\ e^{j\theta} \\ e^{j2\theta} \\ e^{j3\theta} \end{bmatrix} \right\}$ |

Fig. 6

| Layer # | Codebook |
|---|---|
| 1 | $W_\Delta^6 = \left\{ \begin{bmatrix} 1 \\ e^{j\theta} \\ 1 \\ 1 \end{bmatrix}, \begin{bmatrix} 1 \\ 1 \\ e^{j\theta} \\ 1 \end{bmatrix}, \begin{bmatrix} 1 \\ 1 \\ 1 \\ e^{j\theta} \end{bmatrix}, \begin{bmatrix} 1 \\ e^{-j\theta} \\ 1 \\ 1 \end{bmatrix}, \begin{bmatrix} 1 \\ 1 \\ e^{-j\theta} \\ 1 \end{bmatrix}, \begin{bmatrix} 1 \\ 1 \\ 1 \\ e^{-j\theta} \end{bmatrix} \right\}$ |
| 2 | $W_\Delta^{18} = \left\{ W_\Delta^6, \begin{bmatrix} 1 \\ e^{\pm j\theta} \\ e^{\pm j\theta} \\ 1 \end{bmatrix}, \begin{bmatrix} 1 \\ e^{\pm j\theta} \\ 1 \\ e^{\pm j\theta} \end{bmatrix}, \begin{bmatrix} 1 \\ 1 \\ e^{\pm j\theta} \\ e^{\pm j\theta} \end{bmatrix} \right\}$ |
| 3 | $W_\Delta^{26} = \left\{ W_\Delta^{18}, \begin{bmatrix} 1 \\ e^{\pm j\theta} \\ e^{\pm j\theta} \\ e^{\pm j\theta} \end{bmatrix} \right\}$ |

Fig. 7

| Layer # | Codebook |
|---|---|
| 1 | $W_\Delta^6 = \left\{ \begin{bmatrix} 1 \\ e^{j\theta} \\ 1 \\ 1 \end{bmatrix}, \begin{bmatrix} 1 \\ 1 \\ e^{j\theta} \\ 1 \end{bmatrix}, \begin{bmatrix} 1 \\ 1 \\ 1 \\ e^{j\theta} \end{bmatrix}, \begin{bmatrix} 1 \\ e^{-j\theta} \\ 1 \\ 1 \end{bmatrix}, \begin{bmatrix} 1 \\ 1 \\ e^{-j\theta} \\ 1 \end{bmatrix}, \begin{bmatrix} 1 \\ 1 \\ 1 \\ e^{-j\theta} \end{bmatrix} \right\}$ |
| 2 | $W_{2\Delta}^6 = \left\{ \begin{bmatrix} 1 \\ e^{j2\theta} \\ 1 \\ 1 \end{bmatrix}, \begin{bmatrix} 1 \\ 1 \\ e^{j2\theta} \\ 1 \end{bmatrix}, \begin{bmatrix} 1 \\ 1 \\ 1 \\ e^{j2\theta} \end{bmatrix}, \begin{bmatrix} 1 \\ e^{-j2\theta} \\ 1 \\ 1 \end{bmatrix}, \begin{bmatrix} 1 \\ 1 \\ e^{-j2\theta} \\ 1 \end{bmatrix}, \begin{bmatrix} 1 \\ 1 \\ 1 \\ e^{-j2\theta} \end{bmatrix} \right\}$ |

Fig. 8

| Layer # | Codebook |
|---|---|
| 1 | $W_{\Delta_1}^6 = \left\{ \begin{bmatrix} 1 \\ e^{j\theta} \\ 1 \\ 1 \end{bmatrix}, \begin{bmatrix} 1 \\ 1 \\ e^{j\theta} \\ 1 \end{bmatrix}, \begin{bmatrix} 1 \\ 1 \\ 1 \\ e^{j\theta} \end{bmatrix}, \begin{bmatrix} 1 \\ e^{-j\theta} \\ 1 \\ 1 \end{bmatrix}, \begin{bmatrix} 1 \\ 1 \\ e^{-j\theta} \\ 1 \end{bmatrix}, \begin{bmatrix} 1 \\ 1 \\ 1 \\ e^{-j\theta} \end{bmatrix} \right\}$ |
| 2 | $W_{\Delta_2}^6 = \left\{ \begin{bmatrix} 1 \\ e^{j2\theta} \\ 1 \\ 1 \end{bmatrix}, \begin{bmatrix} 1 \\ 1 \\ e^{j2\theta} \\ 1 \end{bmatrix}, \begin{bmatrix} 1 \\ 1 \\ 1 \\ e^{j2\theta} \end{bmatrix}, \begin{bmatrix} 1 \\ e^{-j2\theta} \\ 1 \\ 1 \end{bmatrix}, \begin{bmatrix} 1 \\ 1 \\ e^{-j2\theta} \\ 1 \end{bmatrix}, \begin{bmatrix} 1 \\ 1 \\ 1 \\ e^{-j2\theta} \end{bmatrix} \right\}$ |
| 3 | $W_{\Delta_3}^{12} = \left\{ \begin{bmatrix} 1 \\ e^{\pm j\theta} \\ e^{\pm j\theta} \\ 1 \end{bmatrix}, \begin{bmatrix} 1 \\ e^{\pm j\theta} \\ 1 \\ e^{\pm j\theta} \end{bmatrix}, \begin{bmatrix} 1 \\ 1 \\ e^{\pm j\theta} \\ e^{\pm j\theta} \end{bmatrix} \right\}$ |
| 4 | $W_{\Delta_4}^{24} = \left\{ \begin{bmatrix} 1 \\ e^{\pm j2\theta} \\ e^{\pm j\theta} \\ 1 \end{bmatrix}, \begin{bmatrix} 1 \\ e^{\pm j2\theta} \\ 1 \\ e^{\pm j\theta} \end{bmatrix}, \begin{bmatrix} 1 \\ 1 \\ e^{\pm j2\theta} \\ e^{\pm j\theta} \end{bmatrix}, \begin{bmatrix} 1 \\ e^{\pm j\theta} \\ e^{\pm j2\theta} \\ 1 \end{bmatrix}, \begin{bmatrix} 1 \\ e^{\pm j\theta} \\ 1 \\ e^{\pm j2\theta} \end{bmatrix}, \begin{bmatrix} 1 \\ 1 \\ e^{\pm j\theta} \\ e^{\pm j2\theta} \end{bmatrix} \right\}$ |
| 5 | $W_{\Delta_5}^{12} = \left\{ \begin{bmatrix} 1 \\ e^{\pm j2\theta} \\ e^{\pm j2\theta} \\ 1 \end{bmatrix}, \begin{bmatrix} 1 \\ e^{\pm j2\theta} \\ 1 \\ e^{\pm j2\theta} \end{bmatrix}, \begin{bmatrix} 1 \\ 1 \\ e^{\pm j2\theta} \\ e^{\pm j2\theta} \end{bmatrix} \right\}$ |

Fig. 9

METHOD FOR RECEIVING DATA IN MULTI INPUT MULTI OUTPUT

CROSS-REFERENCE TO RELATED APPLICATIONS

This application is a 371 U.S. national stage application of International Application No. PCT/KR2009/006515, filed on Nov. 6, 2009, which claims priority to U.S. Provisional Application Ser. No. 61/221,546, filed on Jun. 29, 2009, the contents of which are incorporated by reference herein in their entirety.

TECHNICAL FIELD

The present invention relates to a data reception method, and particularly, to a method for receiving data in a multi-input multi-out (MIMO) system.

BACKGROUND ART

Recently, wireless communication techniques for providing various multimedia services in wireless communication environments are being developed. In order to provide high quality multimedia services, data transmission at a high speed is required. As a representative technique for supporting data transmission at a high speed, research on a Multiple Input Multiple Output (MIMO) technique is actively ongoing.

According to the MIMO technique, a plurality of antennas are used to increase channel capacity within limited frequency resources. In an environment where scattering is rich, a plurality of antennas are used to provide channel capacity theoretically proportional to the number of antennas.

According to the MIMO technique, a space and area where antennas can be installed are limited, and a spacing between antennas much influences on communication performance. That is, the narrower the spacing between antennas is, the higher a correlation between radio channels is. Especially, when antennas have the same polarization, radio channels have a very high correlation with each other. The radio channels having a high correlation are not completely independent from each other. Accordingly, the high correlation may prevent increase of a sum data rate of a communication system using the MIMO technique. Furthermore, interference occurring between the radio channels may reduce the reliability of data communication, and may reduce a data transmission rate.

In order to efficiently transmit data according to the MIMO technique, data has to be coded in advance, which is referred to as 'pre-coding'. And, a rule for data pre-coding is expressed as a matrix, which is referred to as 'pre-coding matrix'. The pre-coding matrix is generated based on one or more codeword matrices included in a codebook.

A base station performs data pre-coding based on information about a channel status between itself and a terminal, and transmits the pre-coded data to the terminal. Then, the terminal measures a channel between itself and the base station, and feedbacks information to the base station on the measured channel.

The conventional closed-loop MIMO technique may enhance the efficiency of a MIMO system by exchanging feedback information between a transmitter and a receiver through a reverse direction channel.

The feedback information exchanged in the conventional closed-loop MIMO technique includes channel status information, transmission signal process vector information, etc.

Especially, a closed-loop MIMO beam-forming technique for obtaining an array gain based on a diversity gain and multi-transmission antennas has been applied to a communication system standard such as 3GPP release-99, 3GPP LTE, and IEEE 802.16e, by using vectors which process beam-forming transmission signals based on a codebook.

Methods for generating a codebook may include a Grassmannian packing method, a Lloyd-type vector quantization method, a discrete Fourier transform (DFT) method, etc. Especially, the methods for generating a codebook may include a Grassmannian based Householder method in IEEE 802.16e, and may include a DFT based Householder method in 3GPP LTE.

The Grassmannian packing method indicates a method for selecting vectors equally spaced from each other in a domain based on a characteristic that optimal beam-forming vectors are isotropically distributed in the domain where beam-forming signal process vectors exist, and for configuring a codebook based on the selected vectors.

The Lloyd-type vector quantization method indicates a method for quantizing beam-forming vectors into representative vectors that can minimize a preset expectation value of a distortion function with consideration of a randomly distributed characteristic of a channel matrix.

The DFT method indicates a method for using a Fourier transform matrix having a unitary characteristic as a codebook.

The Householder method indicates a method for generating a matrix having a unitary characteristic, the matrix which enables a multi-stream or multi-user closed-loop MIMO system by using preset beam-forming vectors.

Figure 1:
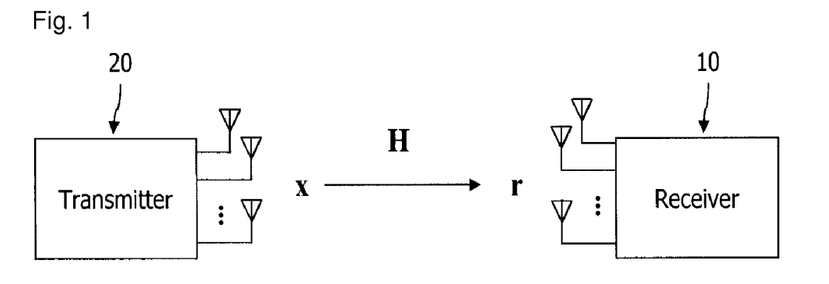
FIG. 1 is a view showing a MIMO system in accordance with the conventional art.

FIG. 1 shows a MIMO system in accordance with the conventional art.

As shown in FIG. 1, a transmitter 20 is provided with NT antennas, and a receiver 10 is provided with $N_R$ antennas.

$N_R \times 1$ reception signal vectors received from the transmitter 20 having $N_T$ antennas by the receiver 10 having $N_R$ antennas may be expressed as the following Equation 1.

$$r = Hx + n \qquad \text{Equation 1}$$

Here, H denotes a channel matrix of $N_R \times N_T$, X denotes a $N_T \times 1$ transmission signal vector, and n denotes additive white Gaussian noise (AWGN) of $N_R \times 1$.

The channel matrix (H) may be expressed as the following Equation 2 by a singular value decomposition (SVD).

$$H = U\Sigma V^H \qquad \text{Equation 2}$$

Here, $\Sigma = \mathrm{diag}\{\sigma 1, \sigma 2, \ldots, \sigma_{rank(H)}\}$ denotes a diagonal matrix composed of Eigen values of H, and $U = [u_1, u_2, \ldots, u_{rank(H)}]$ and $V = [v_1, v_2, \ldots, v_{rank(H)}]$ are matrices composed of Eigen vectors corresponding to the Eigen values.

Accordingly, an index of a maximum Eigen value is defined as $$m = \begin{array}{c} \mathrm{argmax}\{\sigma_i\} \\ i = 1, \ldots, \mathrm{rank}\{H\}, \end{array}$$

and a method for using $v_m$ and $u_m^H$ as transmission and reception beam-forming vectors is defined as a maximum Eigen-mode transmission method.

However, the conventional beam-forming method has the following problems.

Firstly, the base station has to precisely know the channel status information with the terminal.

Secondly, the transmission beam-forming vector ($v_m$) has to be informed to the base station by a large amount of feedback resources.

As a method for obtaining a beam-forming gain with utilizing only limited feedback resources, there have been proposed codebook-based beam-forming methods. According to the proposed methods, a transmitter and a receiver share a predetermined codebook, and the receiver feedbacks, to the transmitter, only an index indicating beam-forming vectors inside the codebook. Here, in the case of using feedback resources having B bits, $2^B$ beam-forming vectors may be included in the codebook.

However, the codebook-based closed-loop MIMO beam-forming method also utilizes limited number of feedback bits. This may cause a codebook set to be configured, the codebook set having elements corresponding to the number of beam-forming vector indexes that can be indicated by the limited number of feedback bits.

Due to the restrictions that the limited number of bits are used, optimal beam-forming vectors having a random characteristic can not be precisely represented. Especially, the more the number of transmission antennas is, the more performance degradation due to the limited number of feedback bits increases.

Furthermore, beam-forming vectors generated based on feedback information selected by the terminal may be outdated due to a user's mobility, feedback delay, etc. This may result in performance degradation which becomes more severe as the user's mobility is greater and the feedback delay is longer.

DISCLOSURE OF INVENTION

Solution to Problem

Therefore, an object of the present invention is to provide a method for solving performance degradation due to feedback using a limited number of bits.

Another object of the present invention is to provide a method for solving performance degradation due to a user's mobility and feedback delay.

To achieve these and other advantages and in accordance with the purpose of the present invention, as embodied and broadly described herein, there is provided a method for receiving data in a Multi Input Multi Output (MIMO) system, the method comprising: decoding data received from a transmitter by using one beam-forming vector included in a codebook that beam-forming vectors are formed in a hierarchical structure according to at least one of change directions of radio channels, the number of channel change directions, and a change rate; determining whether to update the beam-forming vector based on the radio channel changes; selecting other beam-forming vector included in the codebook having a hierarchical structure when it is determined that update for the beam-forming vector is required; feed-backing information about an index indicating where the selected beam-forming vector is located in the hierarchical structure of the codebook to the transmitter; and decoding data received from the transmitter by using the selected beam-forming vector.

To achieve these and other advantages and in accordance with the purpose of the present invention, as embodied and broadly described herein, there is also provided a terminal having multi antennas, the terminal comprising: a storage unit configured to store a codebook that beam-forming vectors are formed in a hierarchical structure according to at least one of change directions of radio channels, the number of channel change directions, and a change rate; a processor configured to decode data transmitted from a transmitter by using one beam-forming vector included in the codebook having a hierarchical structure, configured to determine whether to update the beam-forming vector based on the radio channel changes, and configured to select other beam-forming vector included in the codebook with consideration of the radio channel changes when it is determined that update for the beam-forming vector is required; and a transceiver configured to transmit information about an index indicating where the selected beam-forming vector is located in the hierarchical structure of the codebook to the transmitter.

The index of the selected beam-forming vector may indicate information on which layer the selected beam-forming vector is located and where the selected beam-forming vector is located in the layer.

The hierarchical structure of the codebook may be implemented such that each layer has a different channel change direction.

The hierarchical structure of the codebook may be implemented such that each layer has a different number of channel change directions.

The hierarchical structure of the codebook may be implemented such that each layer has a different channel change rate.

The selection for other beam-forming vector may be performed with consideration of correlation with the previously fed-back beam-forming vector.

The present invention may have the following advantages.

Firstly, performance degradation due to feedback using a limited number of bits may be solved.

Secondly, performance degradation due to a user's mobility and feedback delay may be solved.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4 to 8 are exemplary views each showing a hierarchical structure of a codebook.

MODE FOR THE INVENTION

Description will now be given in detail of the present invention, with reference to the accompanying drawings.

The present invention may be applied to all communication systems to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted.

Hereinafter, the term of a 'mobile terminal' will be used. The mobile terminal may be also referred to as a user equipment (UE), a mobile equipment (ME), and a mobile station (MS). The UE may be a mobile device having a communication function, such as a portable phone, a PDA, a smart phone, and a notebook. Also, the UE may be an immobile device such as a PC and a vehicle mounted device.

Figure 2:
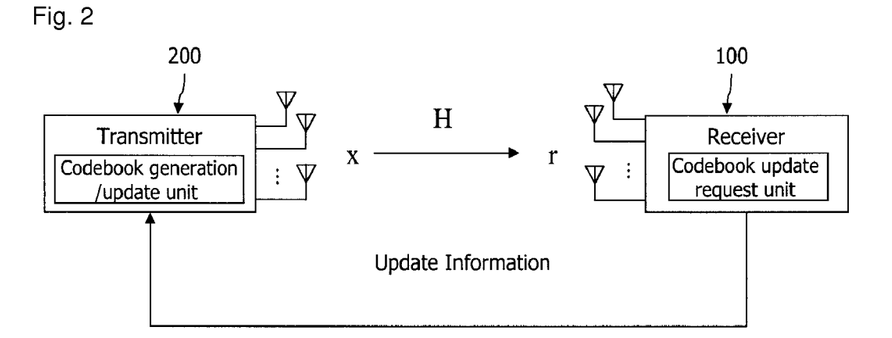
FIG. 2 is a view showing a system according to a first embodiment of the present invention.

FIG. 2 is a view showing a system according to a first embodiment of the present invention.

As shown in FIG. 2, a transmitter 200 is provided with $N_T$ antennas, and a receiver 100 is provided with NR antennas.

$N_R \times 1$ signal vectors received from the transmitter 200 having NT antennas by the receiver 100 having NR antennas may be expressed as the following Equation 3.

$$r = H[n] w_{i[n]} \chi + n \qquad \text{Equation 3}$$

Here, H[n] denotes a channel matrix of $N_R \times N_T$, $w_{i[n]}$ denotes a transmission beam-forming vector of $N_T \times 1$, $\chi$ denotes data transmitted to the receiver 100, and n denotes an additive white Gaussian noise (AWGN) vector of $N_R \times 1$.

[n] included in the channel matrix(H) and the beam-forming vector($w_{i[n]}$) denotes a coherence time block, or a time slot number of a feedback signal. This signifies that the channel matrix (H) and components of transmission beam-forming vectors may be different from each other between [n] and [n+1].

In the case of processing the received signal with using a maximum ratio combining method, a received signal to Noise Ratio (SNR) is obtained as follows.

$$\frac{\|H[n] w_{i[n]}\|_F^2}{N_0} \qquad \text{Equation 4}$$

Here, $N_0$ denotes the average of AWGN power.

The receiver 100 transmits relating information to the transmitter 200 so that the transmitter 200 can use beam-forming vectors that can maximize the Equation 4.

However, in the real system mobility of the receiver 100 (e.g., terminal) and feedback delay exist. Accordingly, beam-forming vectors generated by information fed-back from the receiver 100 can not have their guaranteed optimality.

This channel change rate may be expressed as a normalized Doppler frequency (NDF) parameter defined as a value obtained by multiplying a maximum Doppler frequency determined based on a moving speed of the receiver 100, by feedback delay. The larger the NDF is, the quicker the channel change rate is.

Accordingly, H[n] and H[n+1] have a correlation determined by the NDF, and $w_{i[n]}$ and $w_{i[n+1]}$ have a correlation determined by the NDF in the beam-forming vector.

Accordingly, the first embodiment of the present invention proposes a codebook for selecting beam-forming vectors according to a channel change direction, with consideration of a correlation between feedback beam-forming vectors adjacent to each other.

In the case of a codebook having D channel change directions, a codebook generation/update unit of the transmitter 200 generates the codebook as shown in the following Equation 5.

Then, the transmitter 200 transmits, to the receiver 100, information about the generated codebook, and information about a selected transmission beam-forming vector (e.g., $w_{i[n]}$). And, the transmitter 200 pre-codes data by using the selected transmission beam-forming vector, and then transmits the pre-coded data to the receiver 100.

$$W_\Delta^D = \{w_{1(\Delta)}, w_{2(\Delta)}, \ldots, w_{D(\Delta)}\} \qquad \text{Equation 5}$$

Here, $w_{i(\Delta)}$ and $w_{j(\Delta)}$ denote vectors having different directions, and $\Delta$ denotes a parameter indicating a changed degree in each direction.

Here, i and j are variables each having one value selected from a group $\{1, 2, \ldots, D\}$, and i is not identical to j (i.e., i≠j).

The receiver 100 receives the data by using the codebook transmitted from the transmitter, and the selected transmission beam-forming vector (e.g., $w_{i[n]}$).

A codebook update request unit of the receiver 100 determines information for update of the transmission beam-forming vector, based on the codebook, the transmission beam-forming vector (or previously fed-back transmission beam-forming vector, $w_{i[n]}$), and a channel change direction. Then, the codebook update request unit of the receiver 100 reports the determined information to the transmitter 200 through a feedback channel. If the update information fed-back to the transmitter 200 by the receiver 100 indicates a dth vector in the matrix shown in the Equation 5, the transmitter 200 updates the transmission beam-forming vector ($w_{i[n]}$) according to the following Equation 6, thereby generating a new transmission beam-forming vector ($w_{i[n+1]}$).

$$w_{i[n+1]} = (w_{i[n]} + w_{d(\Delta)}) / \|(w_{i[n]} + w_{d(\Delta)})\| \quad \text{Equation 6}$$

The receiver 100 also generates a new beam-forming vector ($w_{i[n+1]}$) according to the Equation 6, The transmitter pre-codes the data by using the new beam-forming vector ($w_{i[n+1]}$), and transmits the pre-coded data to the receiver 100.

Then, the receiver 100 decodes the data by using the transmission beam-forming vector (e.g., $w_{i[n+1]}$). These processes are repeatedly performed.

Figure 3:
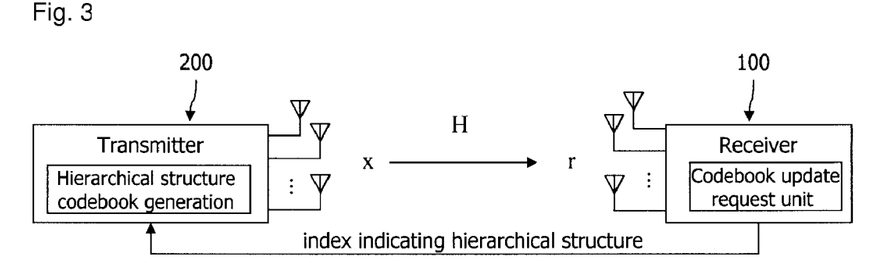
FIG. 3 is a view showing a system according to a second embodiment of the present invention.

FIG. 3 is a view showing a system according to a second embodiment of the present invention.

According to the second embodiment shown in FIG. 3, a codebook optimal to the aforementioned various channel change directions and channel change rates is generated in a multi-hierarchical structure, thereby being utilized to update beam-forming vectors.

The second embodiment is similar to the first embodiment, and thus only different parts from the first embodiment will be explained.

The codebook generation unit of the transmitter 200 generates a hierarchical structure of a codebook so that each layer can have a different characteristic, based on factors to optimize the codebook.

The factors to optimize the codebook include at least one of a change direction of a codebook channel, the number of channel change directions, and a change rate of the codebook.

Firstly, the channel directions of the codebook are determined by element vectors inside a codebook set shown in the Equation 5. Accordingly, each layer of the codebook may be designed to have one or more element vectors having different directivities.

Secondly, the number of channel change directions of the codebook is determined by the number of element vectors inside a codebook set shown in the Equation 5. Accordingly, each layer of a codebook may be designed to have a different number of element vectors.

Thirdly, the channel change rate of the codebook is defined as a parameter ($\Delta$) which represents a changed degree in each direction defined in the codebook set shown in the Equation 5. Accordingly, each layer of a codebook may be designed to have a different changed rate ($\Delta$).

The codebook generation unit of the transmitter 200 generates a hierarchical structure based on at least one of the three optimization factors.

The codebook update request unit of the receiver 100 transmits a feedback signal to the transmitter 200. The feedback signal may include an index indicating information on which layer the selected beam-forming vector is located and where the selected beam-forming vector is located in a layer.

The transmitter 200 may allocate uplink resources for the feedback signal in several manners.

For instance, the transmitter 200 may allocate different independent resources for a first index indicating which layer the selected beam-forming vector is located, and a second index indicating where the selected beam-forming vector is located in a layer. Alternatively, the transmitter 200 may allocate the same resource for both the first index and the second index.

In another alternative manner, the transmitter 200 may perform the resource allocation periodically, or upon receipt of request from the receiver 100.

Hereinafter, the operation of the MIMO system according to the present invention will be explained for understanding of the second embodiment.

It is assumed that the number of antennas of the transmitter 200 is four (NT=4). And, the beam-forming vector may include magnitude information and phase information as a signal process value to be multiplied by each antenna element. However, the case that the beam-forming vector transmits only phase information will be explained hereinafter.

To generates a codebook having various channel change directions and change rates, there are general methods such as a DFT matrix method, a Grassmannian packing method, a Lloyd-type RVQ algorithm method, and a Householder reflection method. Hereinafter, will be explained a DFT matrix method, and a phase change tracking method according to each antenna.

The resource allocation for feedback signals may be performed periodically according to each feedback period, or may be performed upon receipt of request from the receiver. Hereinafter, will be explained a case that resource allocation for movement between each layer, and for beam-forming vector update is performed according to each feedback period.

The receiver 100 transmits, to the transmitter 200, information for updating a beam-forming vector to be used in the next feedback period based on a beam-forming vector used in the current feedback period by the transmitter 200. Here, update for a beam-forming vector may not be required like a case that $w_{[n+1]} = w_{i[n]}$. Hereinafter, this case will be referred to as a 'stay state', and information relating to the 'stay state' is included in a feedback signal transmitted to the transmitter 200 by the receiver 100.

As one example to generate the codebook of the present invention, adjacent vectors of a DFT matrix may be used when D is 2 (D=2). In this case, a codebook as shown in the following Equation 7 may be generated.

$$W_\Delta^2 = \left\{ w_{1(\Delta)} = \begin{bmatrix} 1 \\ e^{-j\theta_\Delta} \\ e^{-j2\theta_\Delta} \\ e^{-j3\theta_\Delta} \end{bmatrix}, w_{2(\Delta)} = \begin{bmatrix} 1 \\ e^{j\theta_\Delta} \\ e^{j2\theta_\Delta} \\ e^{j3\theta_\Delta} \end{bmatrix} \right\} \quad \text{Equation 7}$$

As another example, may be used a phase change tracking method according to each antenna. In this case, may be generated a codebook for tracking phase change of one antenna as shown in the following Equation 8.

$$W_\Delta^6 = \quad \text{Equation 8}$$

$$\left\{ \begin{bmatrix} 1 \\ e^{j\theta_\Delta} \\ 1 \\ 1 \end{bmatrix}, \begin{bmatrix} 1 \\ 1 \\ e^{j\theta_\Delta} \\ 1 \end{bmatrix}, \begin{bmatrix} 1 \\ 1 \\ 1 \\ e^{j\theta_\Delta} \end{bmatrix}, \begin{bmatrix} 1 \\ e^{-j\theta_\Delta} \\ 1 \\ 1 \end{bmatrix}, \begin{bmatrix} 1 \\ 1 \\ e^{-j\theta_\Delta} \\ 1 \end{bmatrix}, \begin{bmatrix} 1 \\ 1 \\ 1 \\ e^{-j\theta_\Delta} \end{bmatrix} \right\}$$

As still another example, may be generated a codebook for tracking phase changes of two antennas as shown in the following Equation 9.

$$W_\Delta^{18} = \left\{ W_\Delta^6, \begin{bmatrix} 1 \\ e^{\pm j\theta_\Delta} \\ e^{\pm j\theta_\Delta} \\ 1 \end{bmatrix}, \begin{bmatrix} 1 \\ e^{\pm j\theta_\Delta} \\ 1 \\ e^{\pm j\theta_\Delta} \end{bmatrix}, \begin{bmatrix} 1 \\ 1 \\ e^{\pm j\theta_\Delta} \\ e^{\pm j\theta_\Delta} \end{bmatrix} \right\}$$

Equation 9

As yet still another example, may be generated a codebook for tracking phase changes of three antennas as shown in the following Equation 10.

$$W_\Delta^{26} = \left\{ W_\Delta^{18}, \begin{bmatrix} 1 \\ e^{\pm j\theta_\Delta} \\ e^{\pm j\theta_\Delta} \\ e^{\pm j\theta_\Delta} \end{bmatrix} \right\}$$

Equation 10

FIGS. 4 to 8 are exemplary views each showing a hierarchical structure of a codebook.

Figure 4:
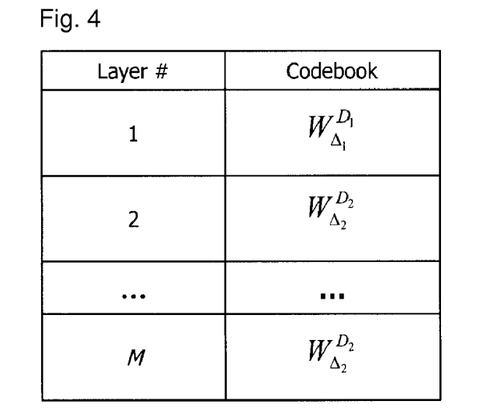

The codebook of FIG. 4 is designed such that a hierarchical structure thereof can have different channel change directions and channel change rates.

Figure 5:
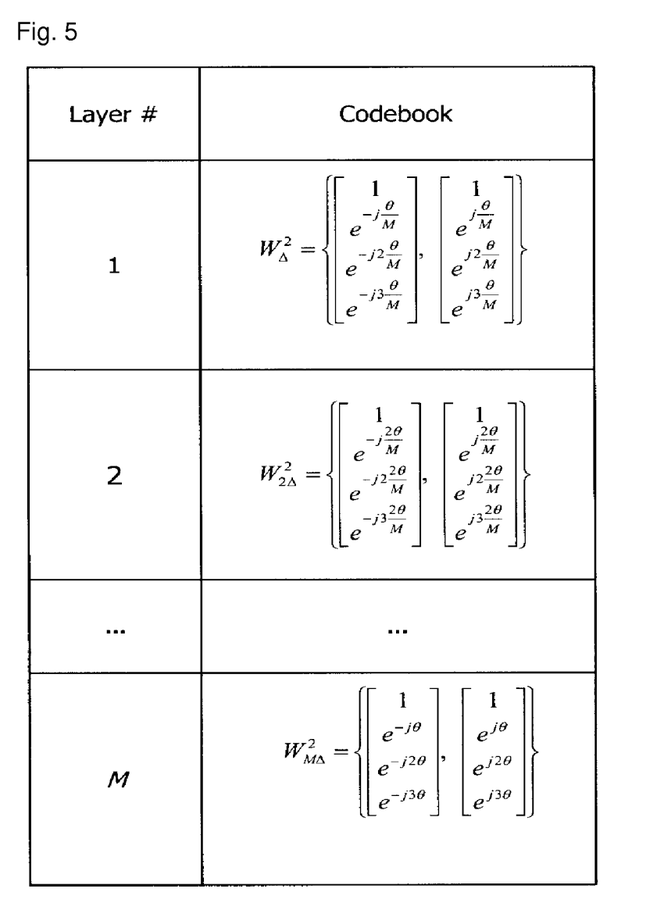

The codebook of FIG. 5 is designed such that a hierarchical structure thereof can have the same channel change direction and number of channel change directions, but have different channel change rates.

The codebook of FIG. 6 is designed such that a hierarchical structure thereof can have the same channel change rate, but have different channel change directions and number of channel change directions.

The codebook of FIG. 7 is designed such that a hierarchical structure thereof can have the same channel change direction and number of channel change directions, but have different channel change rates. In this case, will be explained a method for independently allocating resources for feedback signals for movement between each layer and for update beam-forming vectors. Firstly, since the codebook is composed of two layers, resources of one-bit may be allocated for an index indicating movement between each layer. Also, each layer of the code book has six beam-forming vector update information, and totally has seven information with including the 'stay state'. Accordingly, in order to update beam-forming vectors, three bits are required with including one reserved state. And, feedback resources of total four bits may be allocated.

The codebook of FIG. 8 is designed such that a hierarchical structure thereof can have different channel change directions, different number of channel change directions, and different channel change rates. In this case, the same resources are allocated for feedback signals. The codebook of FIG. 7 has five layers, and the total number of beam-forming vector update information of each layer is 60. When the 'stay state' and three 'reserved states' are added to 60, the total number of states is 64. This may allow the resources to be allocated for feedback signals of six-bit.

Figure 9:
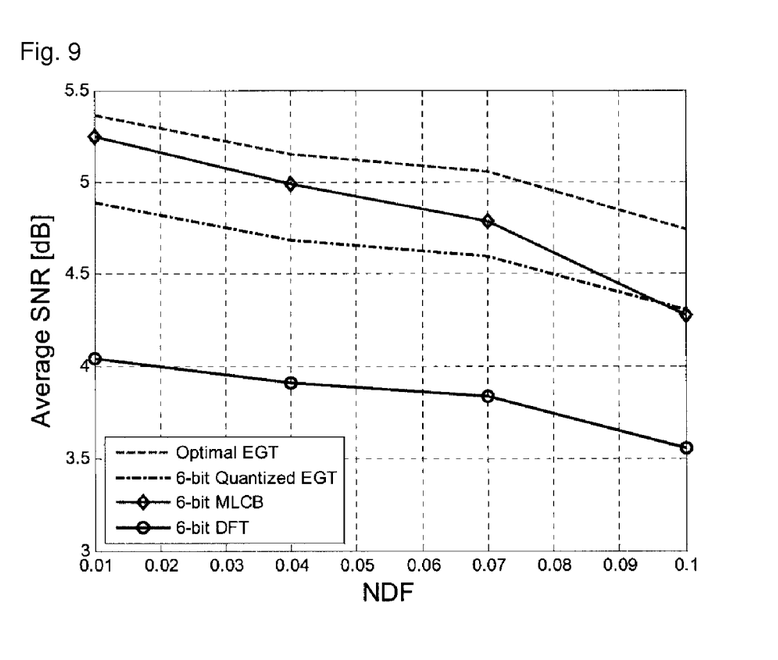
FIG. 9 is a view showing simulation results of the system according to a second embodiment of the present invention.

FIG. 9 is a view showing simulation results of the system according to a second embodiment of the present invention.

In FIG. 9, environments of $N_R=1$, $N_T=4$, and $N_0=1$ were considered, and channel changes occurring due to mobility of the receiver and feedback delay were evaluated in a period of NDF=0.01~0.1.

Information was fed-back to the transmitter 200 by the receiver 100 with consideration of only a phase value according to each antenna. In order to maintain transmission power according to each antenna as a constant value, a transmission beam-forming vector shown in the following Equation 11 was assumed.

$$W_{i[n]} = \frac{1}{\sqrt{N_T}} \begin{bmatrix} 1 \\ e^{j\theta_1[n]} \\ e^{j\theta_2[n]} \\ e^{j\theta_3[n]} \end{bmatrix}$$

Equation 11

In order to test performance of the present invention, were used an "Optimal EGT" method for informing an optimal beam-forming vector to a base station by using limitless feedback resources, a "6-bit Quantized EGT" method for transmitting phase information quantized into 2-bit according to each antenna (the total number of bits is 6), and a "B-bit DFT" method which utilizes an NT×2B DFT matrix as a codebook.

In order to test performance of the present invention, a codebook having a hierarchical structure shown in FIG. 8 was also used. And, it was assumed that each layer of the codebook of an MLCB has a channel change rate having a size of θ=π/4.

FIG. 9 shows performance of "6-bit MLCB" according to the present invention in comparison with performance of "Optimal EGT", "6-bit Quantized EGT" and "6-bit DFT".

Referring to FIG. 9, the "6-bit MLCB" according to the present invention showed performance more excellent than that of the "6-bit Quantized EGT" method and "6-bit DFT" method in all NDF regions. The MLCB of the present invention may have more enhanced performance by optimally controlling the size of a channel change rate according to changes of NDF, rather than by fixing the size of the change rate to θ=π/4.

In addition, the above various embodiments may be implemented by using, computer software, hardware, or some combination thereof. For instance, the method of the present invention may be stored in the storage medium (e.g., internal memory, flash memory, hard disc, etc.), or may be implemented in codes or commands inside a software program that can be executed by a processor such as a microprocessor inside a mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for receiving data in a Multi Input Multi Output (MIMO) system, the method comprising:
   decoding data received from a transmitter by using one beam-forming vector included in a codebook that beam-forming vectors are formed in a hierarchical structure according to at least one of change directions of radio channels, the number of change directions, and a change rate;
   determining whether to update the beam-forming vector based on a change of the radio channel;
   selecting other beam-forming vector included in the codebook having a hierarchical structure when it is determined that update for the beam-forming vector is required;
   feed-backing information about an index indicating where the selected beam-forming vector is located in the hierarchical structure of the codebook to the transmitter; and
   decoding data received from the transmitter by using the selected beam-forming vector;
   wherein the hierarchical structure of the codebook is implemented such that each layer of at least two layers of the codebook has a different channel change direction.

2. The method of claim 1, wherein the index of the selected beam-forming vector indicates information on which layer of the at least two layers the selected beam-forming vector is located and where the selected beam-forming vector is located in the indicated layer.

3. The method of claim 1, wherein the hierarchical structure of the codebook is implemented such that each layer of the at least two layers has a different number of channel change directions.

4. The method of claim 1, wherein the hierarchical structure of the codebook is implemented such that each layer of the at least two layers has a different channel change rate.

5. The method of claim 1, wherein the selection for other beam-forming vector is performed with consideration of correlation with the previously fed-back beam-forming vector.

6. A terminal having multi antennas, the terminal comprising:
   a storage unit configured to store a codebook that beam-forming vectors are formed in a hierarchical structure according to at least one of change directions of radio channels, the number of channel change directions, and a change rate;
   a processor configured to decode data transmitted from a transmitter by using one beam-forming vector included in the codebook having a hierarchical structure, configured to determine whether to update the beam-forming vector based on a change of the radio channel, and configured to select other beam-forming vector included in the codebook with consideration of the radio channel changes when it is determined that update for the beam-forming vector is required; and
   a transceiver configured to transmit information about an index indicating where the selected beam-forming vector is located in the hierarchical structure of the codebook to the transmitter;
   wherein the hierarchical structure of the codebook is implemented such that each layer of at least two layers of the codebook has a different channel change direction.

7. The terminal of claim 6, wherein the index of the selected beam-forming vector indicates information on which layer of the at least two layers the selected beam-forming vector is located and where the selected beam-forming vector is located in the indicated layer.

8. The terminal of claim 6, wherein the hierarchical structure of the codebook is implemented such that each layer of the at least two layers has a different number of channel change directions.

9. The terminal of claim 6, wherein the hierarchical structure of the codebook is implemented such that each layer of the at least two layers has a different channel change rate.

* * * * *